United States Patent
Miyahara et al.

(10) Patent No.: US 11,356,567 B1
(45) Date of Patent: Jun. 7, 2022

(54) IMAGE FORMING APPARATUS, IMAGE PROCESSING METHOD, AND IMAGE FORMING METHOD FOR SPEEDING UP CONTINUOUS MONOCHROME DOCUMENT IN AUTO COLOR MODE

(71) Applicant: KYOCERA Document Solutions Inc., Osaka (JP)

(72) Inventors: Norifumi Miyahara, Torrance, CA (US); Kunihiko Shimamoto, Torrance, CA (US); Kendrick Esperanza Wong, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/163,466

(22) Filed: Jan. 31, 2021

(51) Int. Cl.
  *H04N 1/00* (2006.01)
  *H04N 1/60* (2006.01)

(52) U.S. Cl.
  CPC ....... *H04N 1/00005* (2013.01); *H04N 1/0009* (2013.01); *H04N 1/00039* (2013.01); *H04N 1/00047* (2013.01); *H04N 1/00068* (2013.01); *H04N 1/00082* (2013.01); *H04N 1/60* (2013.01)

(58) Field of Classification Search
  None
  See application file for complete search history.

(56) References Cited

U.S. PATENT DOCUMENTS

| 7,999,966 B2 * | 8/2011 | Fritz | G06Q 30/0283 358/1.18 |
| 2003/0164971 A1 * | 9/2003 | Kidani | H04N 1/46 358/1.13 |

FOREIGN PATENT DOCUMENTS

| JP | 2004054062 A | * | 2/2004 |
| JP | 2010-004271 A | | 1/2010 |

* cited by examiner

*Primary Examiner* — Scott A Rogers
(74) *Attorney, Agent, or Firm* — Hawaii Patent Services; Nathaniel K. Fedde; Kenton N. Fedde

(57) ABSTRACT

Provided is an image forming apparatus that speeds up the auto color mode. The image forming apparatus includes a document reading unit that reads a document including a plurality of pages and outputs image data and can determine whether the document is a color document or a monochrome document. In the document read by the document reading unit, when monochrome pages of the first specific number of pages or more continues in the same job, a document determining unit predicts that the subsequent page is also determined to be a monochrome document. When the document is predicted by the document determination unit to be a monochrome document, an image processing unit performs monochrome image processing for the monochrome document on the image data immediately after reading.

12 Claims, 6 Drawing Sheets

FIG.5
A 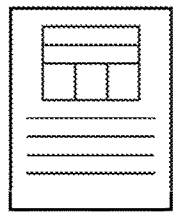
B 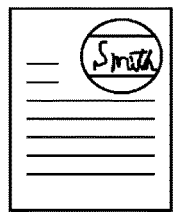
C 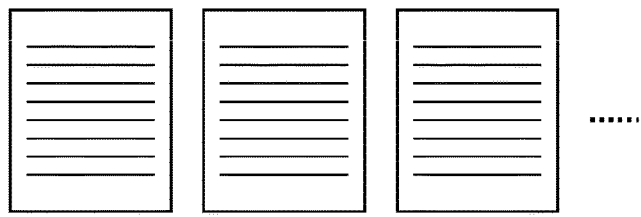
SECOND SPECIFIC NUMBER OF PAGES
D 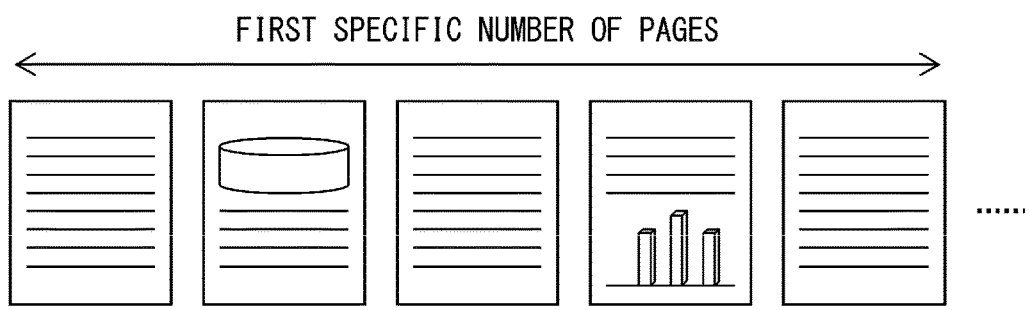
FIRST SPECIFIC NUMBER OF PAGES

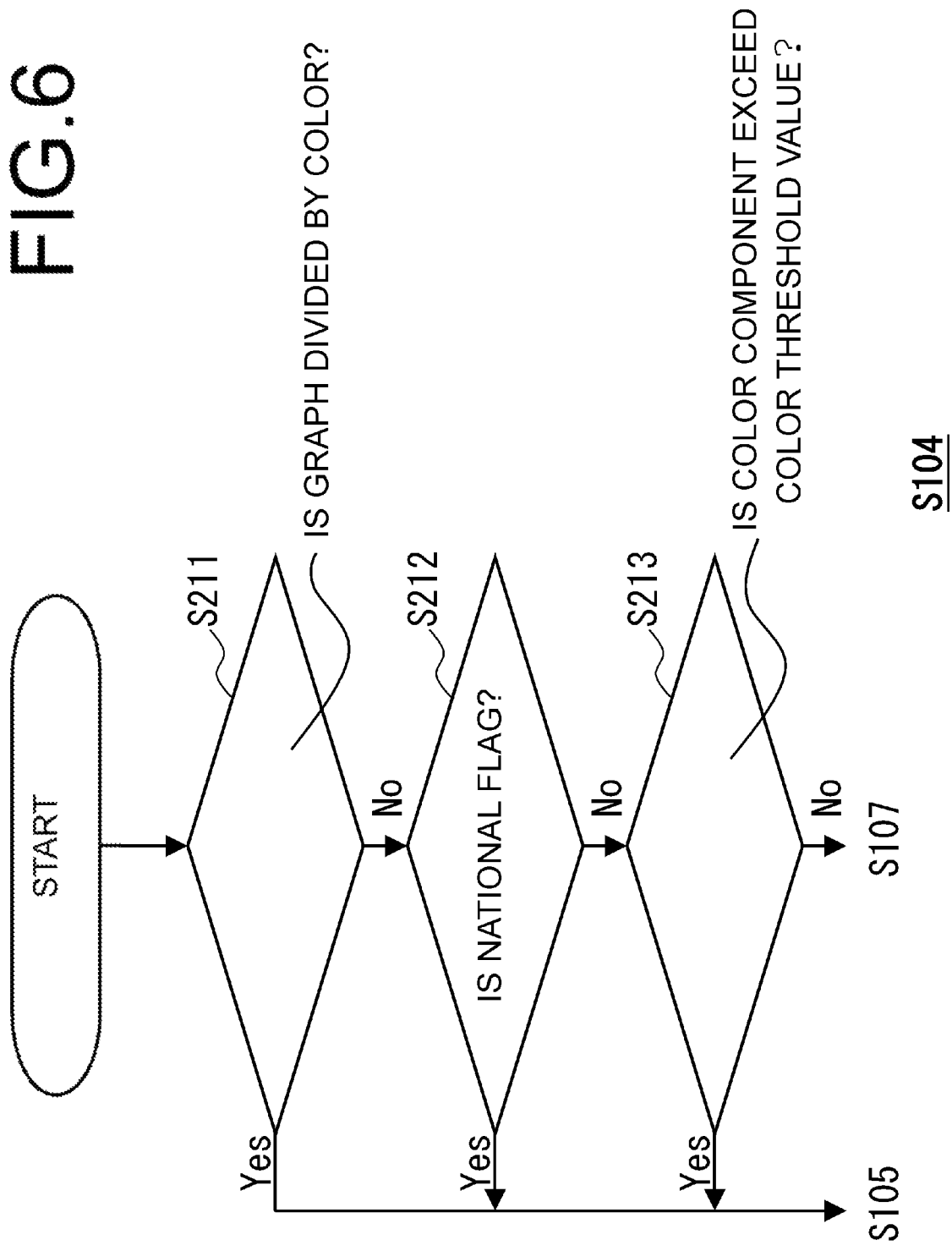

IMAGE FORMING APPARATUS, IMAGE PROCESSING METHOD, AND IMAGE FORMING METHOD FOR SPEEDING UP CONTINUOUS MONOCHROME DOCUMENT IN AUTO COLOR MODE

BACKGROUND

The present disclosure relates to an image forming apparatus, an image processing method, and an image forming method, and more particularly to an image forming apparatus, an image processing method, and an image forming method that speed up an auto color mode.

There is an image forming apparatus such as a multifunctional peripheral (MFP) capable of printing document and images.

Some of the image forming apparatuses are capable of selecting any one of: color mode, monochrome mode, and auto color mode when copying, or the like.

Among them, the color mode is a mode that a document is read in color, and color output is performed. The monochrome mode is a mode that monochrome output is performed regardless of whether the document is monochrome or color. The auto color mode (automatic color-determination mode) is a mode that the document is determined whether color or monochrome, and the color or monochrome output is performed according to the determination.

There is a typical image forming apparatus capable of selecting the auto color mode. In this apparatus, when a specific threshold value is set and the number of color pixels of the document exceeds the threshold value while the document is being read, image processing is started in the color mode. As a result, even in the auto color mode, image processing can be started without waiting for the completion of reading the document.

SUMMARY

An image forming apparatus according to an embodiment of the present disclosure is an image forming apparatus having a document reading unit that reads a document of a plurality of pages and outputs image data and is capable of determining whether the document is a color document or a monochrome document, including: a document determination unit configured to predict that a subsequent page is also a monochrome document when monochrome pages of a first specific number of pages or more continue in the same job in the document read by the document reading unit; and an image processing unit configured to execute monochrome image processing for a monochrome document to the image data immediately after reading the image data when the document is predicted to be a monochrome document by the document determination unit.

An image processing method according to an embodiment of the present disclosure is an image processing method executed by an image processing apparatus having a document reading unit that reads a document of a plurality of pages and outputs image data and is capable of determining whether the document is a color document or a monochrome document, including the steps of: estimating that a subsequent page is also a monochrome document when monochrome pages of a first specific number of pages or more continue in the same job in the document read by the document reading unit; and executing monochrome image processing for a monochrome document to the image data immediately after reading the image data when the document is predicted to be a monochrome document.

An image forming method according to an embodiment of the present disclosure is an image forming method executed by an image forming apparatus having a document reading unit that reads a document of a plurality of pages and outputs image data and is capable of determining whether the document is a color document or a monochrome document, including the steps of: estimating that a subsequent page is also a monochrome document when monochrome pages of a first specific number of pages or more continue in the same job in the document read by the document reading unit; and executing monochrome image processing for a monochrome document to the image data immediately after reading the image data when the document is predicted to be a monochrome document.

BRIEF DESCRIPTION OF THE FIGURE

FIG. 5 is a conceptual diagram of the monochrome document determination as shown in FIG. 4; and FIG. 6 is a conceptual diagram of the color document determination as shown in FIG. 4.

DETAILED DESCRIPTION

Embodiment

[System Configuration of Image Forming Apparatus 1]

The image forming apparatus 1 of the present embodiment is an image processing apparatus having an auto color mode that can discriminate whether a document is a color document or a monochrome document.

Figure 1:
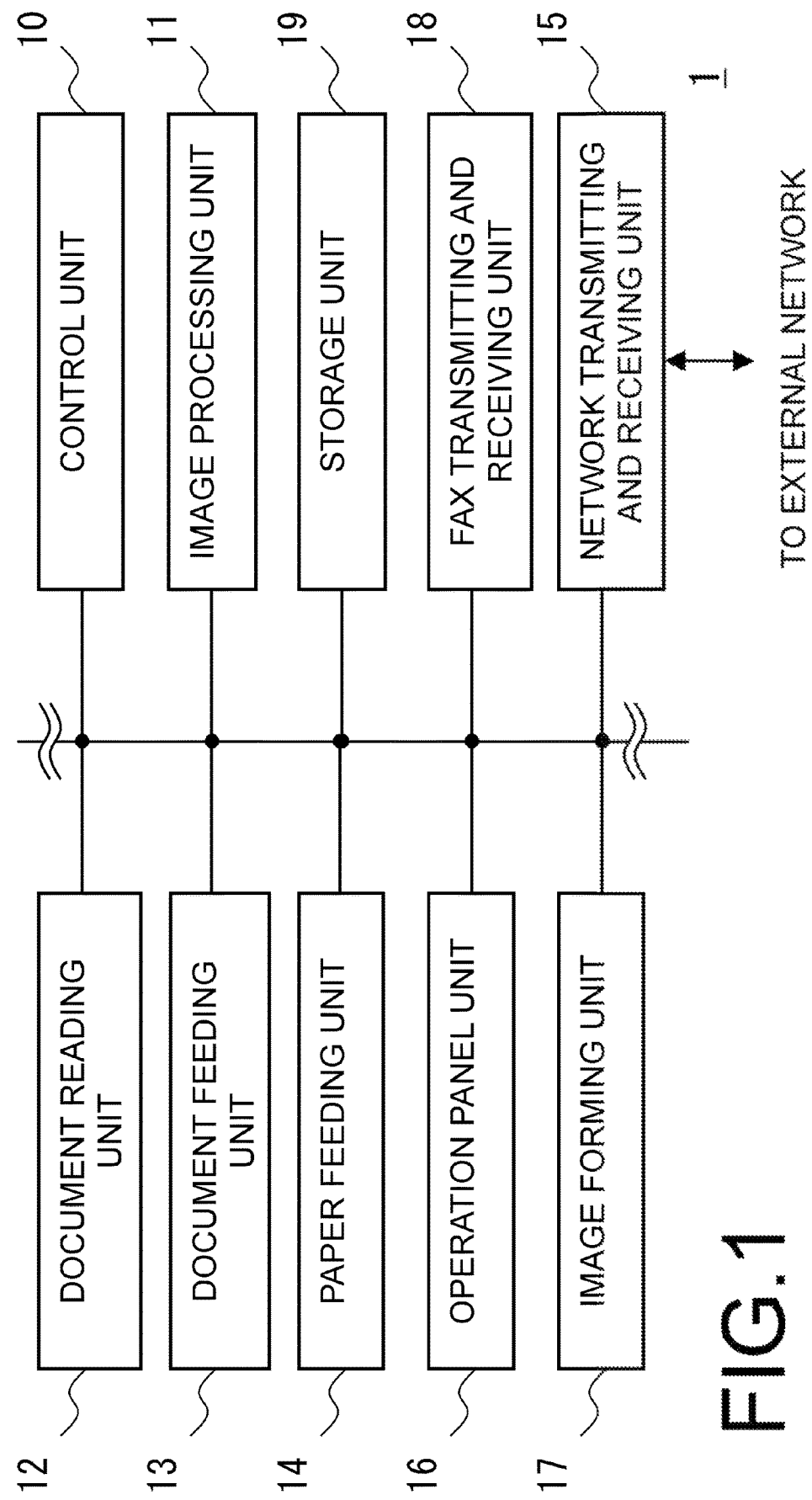
FIG. 1 is a block diagram showing a system configuration of an image forming apparatus according to an embodiment of the present disclosure.

At first, the system configuration of the image forming apparatus 1 is described with reference to FIG. 1.

The image forming apparatus 1 includes a control unit 10, an image processing unit 11, a document reading unit 12, a document feeding unit 13, a paper feeding unit 14, a network transmitting/receiving unit 15, an operation panel unit 16, an image forming unit 17, and a FAX transmitting/receiving unit 18, a storage unit 19, or the like. Each unit is connected to the control unit 10 and its operation is controlled by the control unit 10.

The control unit 10 is an information processing unit such as a GPP (General Purpose Processor), a CPU (Central Processing Unit, a central processing unit), an MPU (Micro Processing Unit), a DSP (Digital Signal Processor), a GPU (Graphics Processing Unit), and an ASIC (Application Specific Integrated Circuit, processor for specific purpose), or the like.

The control unit 10 reads a control program stored in the ROM or the HDD of the storage unit 19, expands it into the RAM, executes the control program, and operates as each unit of a functional block as described later. Further, the control unit 10 controls the entire apparatus according to instruction information input from an external terminal or the operation panel unit 16.

The image processing unit 11 is a control calculation unit such as a DSP (Digital Signal Processor), a GPU (Graphics Processing Unit), an ASIC, or the like. The image processing unit 11 performs image processing on the image data 200 (FIG. 2) read by the document reading unit 12, acquired from an external terminal, stored in a storage folder, or received by the FAX transmitting/receiving unit 18. This image processing may be processing such as enlargement/reduction, density adjustment, gradation adjustment, image improvement, or the like.

Further, the image processing unit 11 stores the processed image data 200 in the storage unit 19 as print data 230. At this time, the image processing unit 11 can also convert the image data 200 that is RGB (Red Green Blue) color into a CMYK (Cyan Magenta Yellow blacK) color, a monochrome, a single color by color space conversion, or the like. As described later, the print data 230 may be band data used for image formation.

The image processing unit 11 can also convert, for example, the image data 200 or the print data 230 (FIG. 2) into an electronic document such as PDF, or the like, or a file of image data such as TIFF, or the like. Further, the image processing unit 11 may be capable of executing at least a part of OCR (Optical Character Recognition) processing.

Further, in the present embodiment, the image processing unit 11 may have a so-called AI (Artificial Intelligence) acceleration function such as a convolutional neural network, or the like. In this case, category-recognizing and labeling of image included in the image data 200 may also be performed. In the present embodiment, the image processing unit 11 can recognize the slip format, the electronic stamp, and the like.

The document reading unit 12 reads the set document and outputs the image data 200. Further, the document reading unit 12 is arranged above the main body of the image forming apparatus 1.

Figure 2:
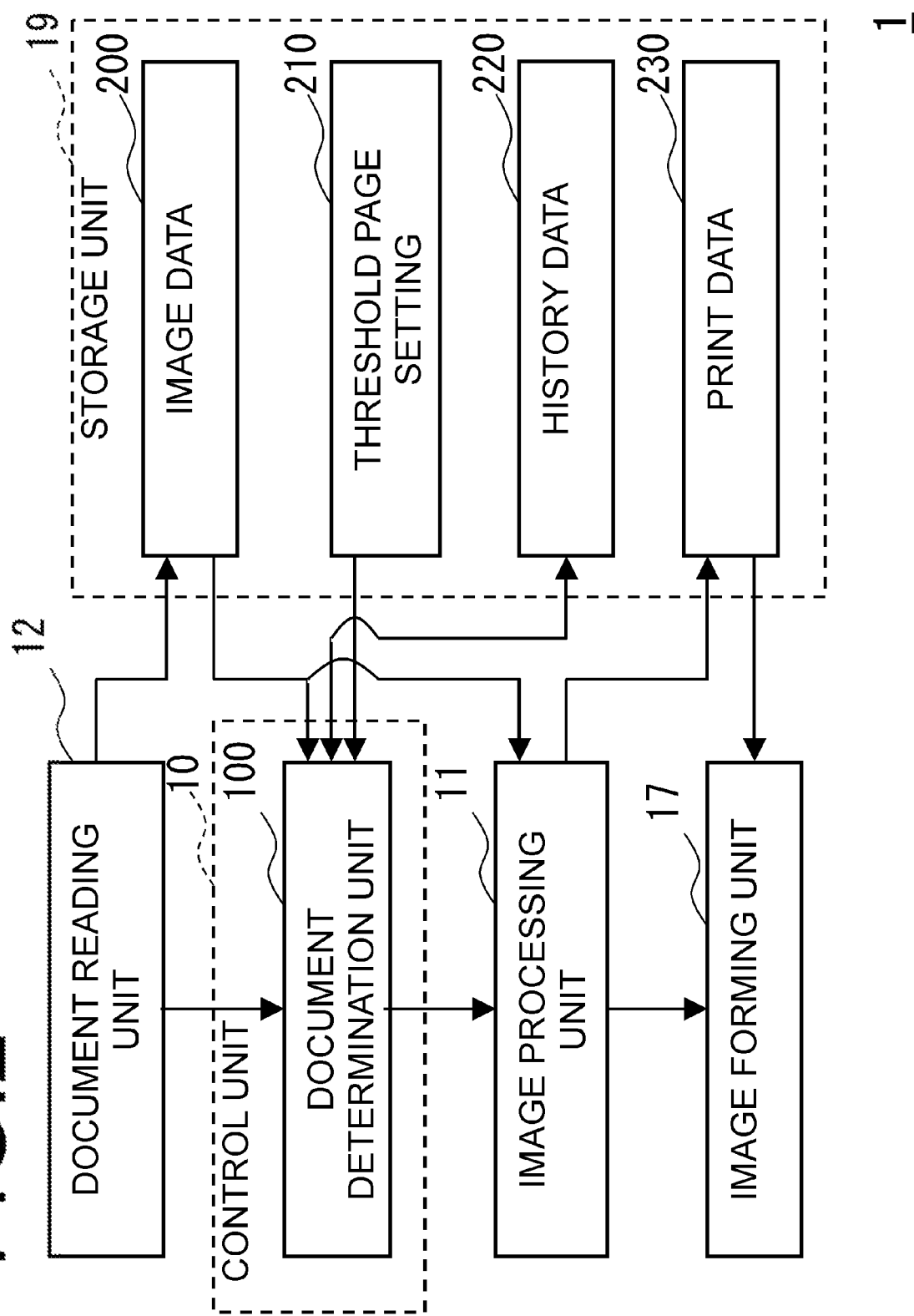
FIG. 2 is a block diagram showing a functional configuration of the image forming apparatus according to the embodiment of the present disclosure.

The document reading unit 12 includes a scanner, a platen glass, and a document reading slit. When reading a document placed on the platen glass, the document reading unit 12 moves the scanner to a position facing the platen glass and reads the document placed on the platen glass while scanning to read the image data 200 (FIG. 2). The document reading unit 12 stores the acquired image data 200 in the storage unit 19.

Further, the document reading unit 12 moves the scanner to a position facing the document reading slit when reading the document fed from the document feeding unit 13. Then, the document reading unit 12 reads the document through the document reading slit in synchronization with the document feeding operation by the document feeding unit 13 and acquires the image data 200. The document reading unit 12 stores the acquired image data 200 in the storage unit 19 as the image data 200.

In the present embodiment, the document reading unit 12 can read a document including a plurality of pages placed on the document placing unit as described below.

The document feeding unit 13 conveys a document read by the document reading unit 12. The document feeding unit 13 is arranged above the document reading unit 12.

The document feeding unit 13 includes a document placing unit and a document transport mechanism. The document feeding unit 13 sequentially feeds out the document placed on the document placing unit one by one by the document feeding mechanism, and it feeds them to the document reading unit 12.

The paper feeding unit 14 feeds the recording paper one by one toward the image forming unit 17. The paper feeding unit 14 is provided in the main body.

The network transmitting/receiving unit 15 is a network connecting unit including a LAN board for connecting to an external network, a wireless transceiver, and the like. The external network in the present embodiment is, for example, a LAN, a wireless LAN, a WAN, a mobile telephone network, a voice telephone network, or the like.

The network transmitting/receiving unit 15 transmits/receives data via a data communication line and transmits/receives a voice signal via a voice telephone line.

The operation panel unit 16 includes an input unit such as a button, a touch panel, and the like, and a display unit such as an LCD (Liquid Crystal Display), an organic EL display, and the like. The operation panel unit 16 is arranged on the front side of the image forming apparatus 1.

The buttons on the input unit of the operation panel unit 16 are buttons of a numeric pad, a start, a cancel, a switching operation mode, an issuing command button for executing a job, or the like. The operation mode may include a mode such as copying, fax transmission, scanner, network scanner, and the like. Further, the job includes printing, transmitting, saving, recording, or the like, for the selected document. The input unit of the operation panel unit 16 acquires various job instructions of the image forming apparatus 1 from the user. Moreover, according to the user's instruction acquired from the operation panel unit 16, inputting and changing the information of each user is also possible.

In the present embodiment, the operation panel unit 16 can specify the document size such as A4, A3, and Letter when copying. For example, this designated document size may be the maximum document size of the embodiment. Alternatively, the maximum size of the document that can be actually read by the document reading unit 12 may be the maximum document size.

The image forming unit 17 forms an image of the print data 230 on a recording paper according to an output instruction from the user.

The image forming unit 17 includes a photosensitive drum, an exposure unit, a developing unit, a transfer unit, a fixing unit, and the like. The image forming unit 17 records a toner image on a recording paper by executing an image forming process including charging, exposure, development, transfer, and fixing.

In the present embodiment, the image forming unit 17 can form a color or monochrome image from the print data 230 (FIG. 2).

The FAX transmitting/receiving unit 18 transmits/receives a facsimile. The FAX transmitting/receiving unit 18 can receive a facsimile from another FAX apparatus via a voice line, save the received image data 200 in the storage unit 19, and cause the image forming unit 17 to form an image. Further, the FAX transmitting/receiving unit 18 can convert a document read by the document reading unit 12 or network FAX data transmitted from an external terminal into print data 230, and it can transmit the print data 230 to another FAX apparatus by a facsimile via a voice line.

The storage unit 19 is a non-transitory recording medium such as a semiconductor memory, which is a ROM (Read Only Memory) or a RAM (Random Access Memory), or the like, or an HDD (Hard Disk Drive), or the like.

The RAM of the storage unit 19 may hold the stored contents by a function such as self-refreshing, or the like, even in the power saving state.

A control program for controlling the operation of the image forming apparatus 1 is stored in the ROM or the HDD of the storage unit 19. In addition to this, the storage unit 19 also stores user account settings. Further, the storage unit 19 may include a storage folder area for each user, which is so-called a document box.

In the image forming apparatus 1, the control unit 10 and the image processing unit 11 may be integrally formed, such as a CPU with a GPU, a chip-on-module package, an SOC (System On a Chip), or the like.

In addition, the control unit 10 and the image processing unit 11 may include a recording medium such as a RAM, a ROM, a flash memory, or the like.

[Image Type Functional Configuration of the Deposition Apparatus 1]

Here, the functional configuration of the image forming apparatus 1 is described with reference to FIG.

The control unit 10 of the image forming apparatus 1 includes a document determination unit 100.

The storage unit 19 stores image data 200, threshold page setting 210, history data 220, and print data 230.

The document determination unit 100 determines whether the page is a color document or a monochrome document based on the ratio of color pixels in the image data 200 to each page of the document read by the document reading unit 12.

In the present embodiment, when the pages of the document read by the document reading unit 12 is in the same job and the monochrome pages continue for the first specific number of pages or more, the document determination unit 100 predicts that the subsequent page is also determined to be a monochrome document. This first specific number of pages is set in the threshold page setting 210 as described later.

Further, the document determination unit 100 refers to the history data 220, and when the page format of the document is similar to that previously printed in monochrome, it can predict that the pages after the page at the time of reference are monochrome document. In addition, the document determination unit 100 can predict that the subsequent page is determined to be a monochrome document even when the area of the image data 200 determined to be an electronic stamp is monochrome.

Furthermore, when the document is predicted to be a monochrome document, the document determination unit 100 causes the image processing unit 11 to execute the monochrome image processing for the monochrome document immediately after being read by the document reading unit 12. That is, the document determination unit 100 causes the image processing unit 11 to execute the monochrome image processing in advance.

In addition to these, the document determination unit 100 may determine that the page of the document is a color document when a graph divided into colors is described on the page of the document and/or when an image determined to be a national flag is included. Further, the document determination unit 100 may determine that the document is a color document when the ratio of the color components of the image data 200 is equal to or more than the color threshold value while the image processing unit 11 is performing the image processing for the monochrome document. When determining the ratio of the color components with respect to the color threshold value, the document determination unit 100 may determine the ratio of the color pixels in the image data 200 to the maximum document size of the document.

When the document determination unit 100 determines that the document is a color document, the document determination unit 100 causes the image processing unit 11 to execute color image processing for a color document.

In the present embodiment, the image processing unit 11 executes image processing for a monochrome document or image processing for a color document, and it outputs the print data 230 to the storage unit 19.

Here, when the document determination unit 100 predicts that the document is a monochrome document, the image processing unit 11 executes monochrome image processing on the image data 200 immediately after the document reading unit 12 reads the document. In the present embodiment, an example in which the white and black or a single-color document is a monochrome document is described.

Otherwise, when the document determination unit 100 determines that the document is a color document, the image processing unit 11 performs color image processing on the image data 200. At this time, if the monochrome image processing has already been performed, the print data 230 may be discarded.

Here, in the present embodiment, the image processing unit 11 can execute the monochrome image processing and the color image processing faster than the reading completion of the document by the document reading unit 12.

The image data 200 is data of an image of a document placed on the document placement unit and read by the document reading unit 12 according to the instruction from the operation panel unit 16. The image data 200 may be, for example, bitmap image data of R (Red), G (Green), B (Blue), and each color is 8 bits, 16 bits, or the like, for each page, where PDL (Page Description Language) data is rendered by the control unit 10.

The threshold page setting 210 stores settings such as the number of pages of the first specific number of pages and the second specific number of pages, the color threshold value, and the like. An administrator or the like can set appropriate threshold values for the first specific number of pages and the second specific number of pages depending on the usage environment of the user. The color threshold value is a threshold for determining whether or not the document is a color document. In the present embodiment, the color threshold value is set as a threshold value of a ratio calculated by dividing the value of the color component of the area read in the image data 200 by the number of pixels of the maximum document size. This ratio may be, for example, about 0.01 to a couple of percent.

The history data 220 is historical data including an estimation result of a monochrome document by the document determination unit 100, a determination result of a color document, a result of image recognition of the image data 200, and a page history at the time of the estimation. For example, the history data 220 may include, as a page history, the image data 200 of the page as well as the format of a table or a slip that is performed the image recognition.

The print data 230 is output data generated from the image data 200. In the present embodiment, the print data 230 is a set of band data generated by color space conversion, or the like, by the image processing unit 11 for each page. The band data is a block of data and becomes document data used for forming an electrostatic latent image on the photosensitive drum of each color when the image is formed by the image forming unit 17. For example, when outputting in monochrome, the band data is monochrome bitmap data. When output in color, the band data is bitmap data of each color of CMYK.

Here, the control unit 10 of the image forming apparatus 1 is caused to function as the document determination unit 100 by executing the control program stored in the storage unit 19.

Further, each unit of the image forming apparatus 1 described above becomes a hardware resource that executes the image processing method and the image forming method of the present disclosure.

It should be noted that a part or an arbitrary combination of the above-mentioned functional configurations may be configured by IC, programmable logic, FPGA (Field-Programmable Gate Array), or the like, in terms of hardware or circuit. Further, the function of the document determination unit 100 can be executed by the image processing unit 11, or at least part of the image processing executed by the image processing unit 11 can be executed by the control unit 10.

[Auto Color Mode Process by Image Forming Apparatus 1]

Next, with reference to FIGS. 3 to 6, the auto color mode process by the image forming apparatus 1 according to the embodiment of the present disclosure is described.

In the automatic color mode process of the present embodiment, about a document read by the document reading unit 12, if the monochrome pages continue the first specific number of pages or more in the same job, the subsequent page is also predicted to be a monochrome document. Then, if the document is predicted to be a monochrome document, the monochrome image processing for the monochrome document for the image data 200 is executed immediately after reading.

In the auto color mode process of the present embodiment, the control unit 10 and the image processing unit 11 mainly execute the program stored in the storage unit 19 by using hardware resources in cooperation with each unit.

Figure 3:
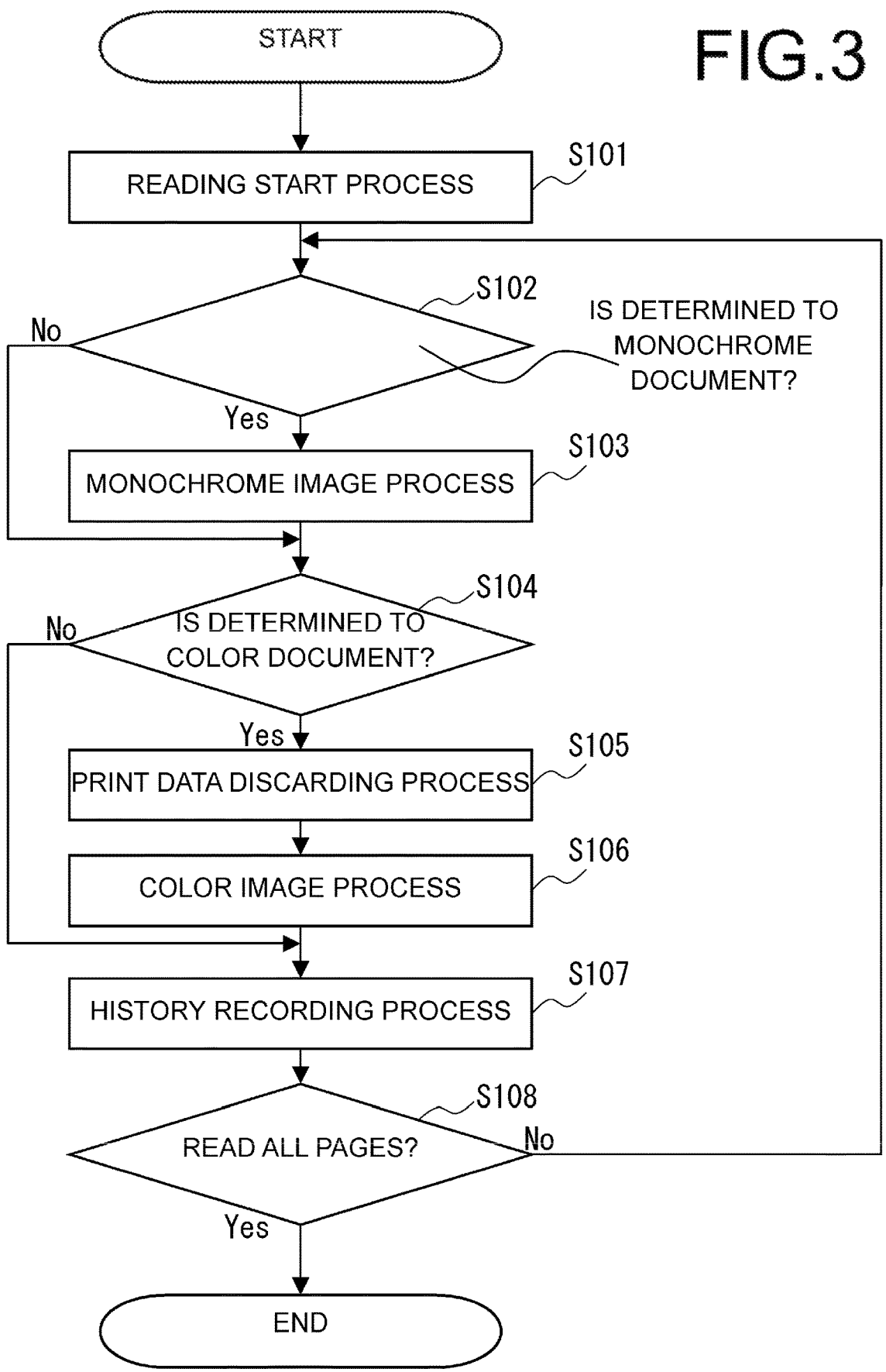
FIG. 3 is a flowchart of auto color mode process according to the embodiment of the present disclosure.

In the following, the main processing of the auto color mode process is explained step by step with reference to the flowchart of FIG. 3.

(Step S101)

At first, the document determination unit 100 performs a reading start process.

In the present embodiment, the user places a monochrome document or a color document including a plurality of pages on the document placing unit. Then, the user selects the auto color mode on the operation panel unit 16 and gives a copy instruction, or the like.

Then, the document determination unit 100 obtains this instruction and causes the document reading unit 12 to start reading the placed document. At this time, for example, the image data 200 until all the pages of the document placed on the document placing unit are read and the user gives an instruction to finish the reading may be treated as the same job.

In addition to copying, transmission, document box storage, facsimile transmission, or the like, can be selected as the instruction for the document.

(Step S102)

Next, the document determination unit 100 determines whether the document is a monochrome document or not. The details of this determination are described later.

If the document determination unit 100 determines that the document is a monochrome document, it determines Yes. If the document determination unit 100 determines that the document is a color document, it determines No.

In the case of Yes, the document determination unit 100 advances the process to step S103.

In the case of No, the document determination unit 100 advances the process to step S104.

(Step S103)

If being determined that the document is a monochrome document, the document determination unit 100 and the image processing unit 11 perform monochrome image process.

The document determination unit 100 causes the image processing unit 11 to perform monochrome image processing for a monochrome document immediately after the document reading unit 12 reads the image data 200 of the determined page. As a result, the image processing unit 11 generates monochrome print data 230 from the image data 200.

(Step S104)

Next, the document determination unit 100 determines whether the document is a color document. The details of this determination are also described later.

If the document determination unit 100 determines that the document is a color document, it determines Yes. If the document determination unit 100 determines that the document is a monochrome document, it determines No.

In the case of Yes, the document determination unit 100 advances the process to step S105.

In the case of No, the document determination unit 100 advances the process to step S107.

(Step S105)

If being determined that the document is a color document, the document determination unit 100 performs the print data 230 discarding process.

Here, although it has been determined that the document is a monochrome document, previously, and the monochrome image processing is performed by the image processing unit 11 immediately after the reading, the processing is performed when it is actually determined that the document is a color document. In such a case, the document determination unit 100 causes the image processing unit 11 to discard the print data 230 being generated and restores the storage capacity.

(Step S106)

Next, the document determination unit 100 and the image processing unit 11 perform color image process.

The document determination unit 100 causes the image processing unit 11 to perform color image processing for a color document on the image data 200.

As a result, the image processing unit 11 generates the color print data 230 including the band data of each color of CMYK.

(Step S107) Here, the document determination unit 100 performs a history recording process.

The document determination unit 100 also causes the image processing unit 11 to perform OCR, image recognition, and the like, during monochrome image processing and color image processing. In this image recognition, a format of a table and a slip can also be recognized.

Then, the document determination unit 100 sets the history data 220 such as above-mentioned the estimation result whether the document is a monochrome document, the determination result whether the document is a color document, the result of the OCR or image recognition of the read image data 200, and the like. At this time, the document determination unit 100 can also store the image data of the page, character data by OCR, the table and slip format by image recognition, and the like, as the page history.

(Step S108)

Next, the document determination unit 100 determines whether all pages of the same job have been read.

The document determination unit 100 determines Yes if all the pages of the document placed on the document placement unit are read and the user gives an instruction to finish the reading. In other cases, the document determination unit 100 determines No.

In the case of Yes, the document determination unit 100 ends the auto color mode process.

In the case of No, the document determination unit 100 returns the process to step S102 and continues reading the page.

With the above, the auto color mode process according to the embodiment of the present disclosure is completed.

Figure 4:
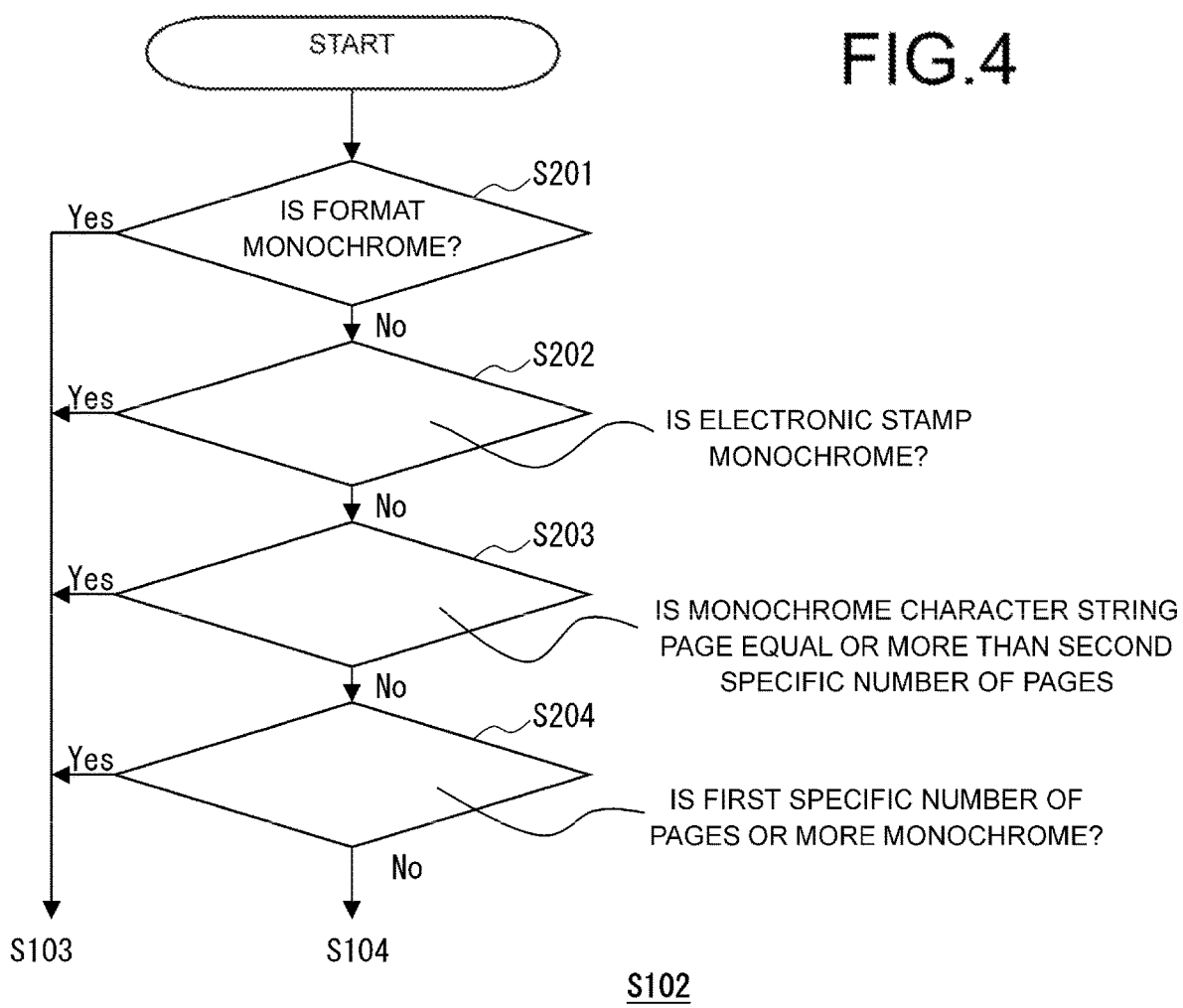
FIG. 4 is a flowchart showing details of the monochrome document determination as shown in FIG. 3.

Next, the details of the determination of monochrome document in step S102 is described with reference to FIG. 4 and FIG. 5.

(Step S201)

At first, the document determination unit 100 determines whether or not the format is monochrome.

According to element A of FIG. 5, the document determination unit 100 refers to the page history of the history data 220. Here, the document determination unit 100 refers to, for example, a result of image recognition of the image data 200 of page read one before (hereinafter, referred to as "the image recognition result"). If this is the same format, which has previously printed in monochrome, the document determination unit 100 determines that the format may be monochrome output even after the next page, that is, Yes. In other cases, the document determination unit 100 determines No.

In the case of Yes, the document determination unit 100 advances the process to step S103.

In the case of No, the document determination unit 100 advances the process to step S202.

(Step S202)

Here, the document determination unit 100 determines whether or not the electronic stamp is monochrome.

According to element B of FIG. 5, the document determination unit 100 refers to the image recognition result of the history data 220. Here, for example, if the document determination unit 100 recognizes the electronic stamp by image recognition and the electronic stamp is printed in monochrome, it determines Yes. In other cases, the document determination unit 100 determines No.

In the case of Yes, the document determination unit 100 advances the process to step S103.

In the case of No, the document determination unit 100 advances the process to step S203.

(Step S203)

Here, the document determination unit 100 determines whether or not the monochrome character string page is equal or more than the second specific number of pages.

According to element C of FIG. 5, the document determination unit 100 refers to the history data 220. For example, if the pages including only the monochrome character string continues for the second specific number of pages or more, the document determination unit 100 predicts that the subsequent page is a determined to be a monochrome document and determines Yes. In other cases, the document determination unit 100 determines No.

In the case of Yes, the document determination unit 100 advances the process to step S103.

In the case of No, the document determination unit 100 advances the process to step S204.

(Step S204)

Here, the document determination unit 100 determines whether or not the first specific number of pages or more is output in monochrome.

According to element D of FIG. 5, the document determination unit 100 refers to the page history of the history data 220. Here, in the case where the monochrome pages of the first specific number of pages or more continues in the same job, the document determination unit 100 predicts that the subsequent page is a monochrome document, and it determines Yes. In other cases, the document determination unit 100 determines No.

In the case of Yes, the document determination unit 100 advances the process to step S103.

In the case of No, the document determination unit 100 advances the process to step S104.

As the above, the description of the monochrome document determination is ended.

Next, the details of the color document determination in step S104 is described with reference to FIG. 6.

(Step S211)

Firstly, the document determination unit 100 determines whether or not the color-based graph is included. Specifically, the document determination unit 100 refers to the page history of the history data 220. Here, the document determination unit 100 refers to, for example, the above-described image recognition result. Then, if a graph that is divided for each color and is difficult to discriminate in monochrome is included, the document determination unit 100 determines Yes. In other cases, the document determination unit 100 determines No.

In the case of Yes, the document determination unit 100 advances the process to step S105.

In the case of No, the document determination unit 100 advances the process to step S212.

(Step S212)

Here, the document determination unit 100 determines whether or not the national flag is included. The document determination unit 100 determines Yes if the result of the image recognition includes a flag, which color is important. The flag, which color is important, includes, in particular, a flag that country cannot be distinguished as monochrome, and a flag such as China Red, or the like. In other cases, the document determination unit 100 determines No.

In the case of Yes, the document determination unit 100 advances the process to step S105.

In the case of No, the document determination unit 100 advances the process to step S213.

(Step S213)

Here, the document determination unit 100 determines whether or not the color component exceeds the color threshold value.

The document determination unit 100 determines whether or not each pixel of the image data 200 in the area read by the document reading unit 12 is the color, or the monochrome or the single color. At this time, the document determination unit 100 calculates, for example, an average value and a difference value of each of RGB component for the pixel. Then, the document determination unit 100 may determine color if the value exceeds a value represented by a specific linear expression, or the like, indicating the width of the error value with respect to the average. Then, the document determination unit 100 calculates the ratio of color pixels in the image data 200 by dividing the number of pixels determined to be the color by the number of pixels in the read area, or the like.

Then, the document determination unit 100 calculates the ratio of the calculated color pixels to the maximum document size of the document. That is, the document determination unit 100 calculates the ratio of color components by dividing the calculated number of color pixels by the number of pixels of the maximum document size of the document, or the like. Then, when the ratio of the color components calculated here is equal to or larger than the color threshold value of the threshold page setting 210, the document determining unit 100 determines that the document is a color document and determines Yes. In other cases, the document determination unit 100 determines No.

In the case of Yes, the document determination unit 100 advances the process to step S105.

In the case of No, the document determination unit 100 advances the process to step S107.

As the above, the description of the color document determination is ended.

With the above configuration, the following effects can be obtained.

In a typical technology, in the auto color mode, even if a plurality of similar documents continue, the threshold value is determined every time, so that the image processing start timing cannot be advanced. For example, even if dozens of copy document are placed on the document placing unit and all the document have the similar content, the determination is performed by the threshold value each time, and then the image processing is started. Therefore, a technology for improving the performance of the auto color mode is desired.

On the other hand, the image forming apparatus 1 according to the embodiment of the present disclosure is an image forming apparatus having a document reading unit 12 that reads a document of a plurality of pages and outputs image data 200 and is capable of determining whether the document is a color document or a monochrome document, including: a document determination unit 100 that predicts that a subsequent page is also determined to be a monochrome document when monochrome pages of a first specific number of pages or more continue in the same job in the document read by the document reading unit 12; and an image processing unit 11 that executes monochrome image processing for a monochrome document to the image data 200 immediately after reading the image data 200 when the document is predicted to be a monochrome document by the document determination unit 100.

With this configuration, in a case of starting a job such as copying in the auto color mode, if the document placed on the document placing unit in the same job is a continuous monochrome document with the first specific number of pages or more, for subsequent document, monochrome image processing is started at the same time as the start of document reading regardless of the threshold value.

As a result, when a document having plurality of pages are placed on the document placing unit for the auto color mode, the start timing of monochrome image processing can be advanced. Therefore, the performance for a monochrome document can be improved. On the other hand, if it is a color document, discarding the print data 230 and starting color image processing is also possible. In this case, performance is unchanged as compared to the typical technology. As a result, in the case of a document having large number of pages, providing the printed matter that has been copied to the user with more comfortable performance is attained.

Further, the image forming apparatus 1 according to the embodiment of the present disclosure further includes a storage unit 19 that store document estimation result and page history by the document determination unit 100, wherein: the document determination unit 100 refers to the history data 220 and, when the format of the page is previously monochrome printed, predicts the page as a monochrome document.

With this configuration, the start timing of monochrome image processing for a slip, or the like, which is recognized to be printed in monochrome can be accelerated. Therefore, to improve the performance of the auto color mode is possible.

Further, in the image forming apparatus 1 according to the embodiment of the present disclosure, the document determination unit 100 predicts that the subsequent page is determined to be a monochrome document even when the pages including only the monochrome character string are continued for the second specific number of pages that is shorter than the first specific number of pages.

With this configuration, the start timing of monochrome image processing, which is a monochrome document including only characters, can be advanced before the estimation of the monochrome document based on continuous pages. Therefore, the performance of the auto color mode can be improved.

Further, in the image forming apparatus 1 according to the embodiment of the present disclosure, the document determination unit 100 predicts that the subsequent page is a monochrome document even when the area of the image data 200 that is determined to be an electronic stamp is monochrome.

With such a configuration, since the electronic stamp that normally performs the color printing such as red is also monochrome, it can be predicted that the document itself is a monochrome document.

As a result, the start timing of the monochrome image processing can be accelerated and improve the performance in the auto color mode.

Further, in the image forming apparatus 1 according to the embodiment of the present disclosure, the document determination unit 100 determines the page is a color document when the page of the document has a graph that is divided for each color and/or includes an image that is determined to be a national flag.

With this configuration, the color document can also be predicted early, and the performance of the auto color mode can be improved.

Other Embodiments

In addition, in the embodiment of the present disclosure, an example that each page is determined to be a color document even if the estimation of a subsequent page is a monochrome document.

However, once there is the estimation that the document is a monochrome document, it is possible to set the same job so that the determination of the auto color mode is not performed because it regards as the monochrome document.

In addition, even after the color is once determined, the monochrome image processing may be performed in advance even after the next page.

With this configuration, further improvement of the performance depending on the environment can be archived.

In the above-described embodiment, an example has been described in which the administrator sets the first specific number of pages and the second specific number of pages according to the environment.

However, the first specific number of pages and the second specific number of pages may be determined by using the history data 220 and may set them, automatically.

In this case, for example, when estimation of a monochrome document continues, statistical information such as an average or variance value of pages, longest page number, or shortest page number, which is actually determined to be a monochrome document may be calculated. In this case, the calculation may be performed for a document having only characters and for a document having characters and images. the first specific page number and the second specific page number can be set based on this statistical information.

With this configuration, the first specific number of pages and the second specific number of pages can be set more appropriately and the performance in the auto color mode can be further improved.

In addition, whether the document is a color document or a monochrome document based on the result of the OCR is possible.

Specifically, for example, when the OCRed character data and the character color is saved, and if there is a color component only in a part of the headline, chapter number, or the like, not in the text, it may be determined as a monochrome document. In addition to this, in the case where OCR could not be performed, for example, when a color component is detected due to discoloration due to aging deterioration, stains, or the like, or the background color other than the character recognition is brown, or the like, the detection of the color component for such areas may be excluded.

With this configuration, determination of a monochrome document becomes more appropriate. Therefore, performance of the auto color mode can be further improved.

In the above-described embodiment, an example in which the monochrome image processing is automatically preceded in the auto color mode by the determination of the first specific page number, the second specific page number, or the like, is described.

However, whether or not to execute the monochrome image processing in advance can be selected by a user. If the preceded monochrome image processing is not executed, whether the document is a monochrome document or a color document based on the color threshold value may be determined for each page.

With this configuration, according to the user's environment, the performance of the auto color mode can be improved.

In the above-described embodiment, an example of determining whether a document of the same job is a monochrome document or a color document has been described.

However, whether the document is a monochrome document, or a color document, may be determined in units of the third specific page number. That is, even for the same job, the determination of color or monochrome may be changed for each page.

With this configuration, for example, a situation that a monochrome document in which one color page is inserted can be handled and can be improved the performance.

The present disclosure can also be applied to information processing apparatuses other than the image forming apparatus. That is, the configuration may be such that a network scanner, a server to which the scanner is separately connected by USB, or the like, is used.

Further, it goes without saying that the configurations and operations of the above-described embodiments are examples and can be appropriately modified and executed without departing from the aim of the present disclosure.

What is claimed is:

1. An image forming apparatus having a document reading unit that reads a document of a plurality of pages and outputs image data and is capable of determining whether the document is a color document or a monochrome document, comprising:
a document determination unit configured to predict that a subsequent page is also determined to be a monochrome document when monochrome pages of a first specific number of pages or more continue in the same job in the document read by the document reading unit;
an image processing unit configured to execute monochrome image processing for a monochrome document to the image data immediately after reading the image data when the document is predicted to be a monochrome document by the document determination unit; and
a storage unit configured to store a result of the prediction and history of a page by the document determination unit, wherein:
the document determination unit refers to the history and, when the format of the page is previously monochrome printed, predicts the page as a monochrome document.

2. An image forming apparatus having a document reading unit that reads a document of a plurality of pages and outputs image data and is capable of determining whether the document is a color document or a monochrome document, comprising:
a document determination unit configured to predict that a subsequent page is also determined to be a monochrome document when monochrome pages of a first specific number of pages or more continue in the same job in the document read by the document reading unit; and
an image processing unit configured to execute monochrome image processing for a monochrome document to the image data immediately after reading the image data when the document is predicted to be a monochrome document by the document determination unit, wherein:
the document determination unit predicts that the subsequent page is determined to be a monochrome document even when the pages including only a monochrome character string are continued for a second specific number of pages that is shorter than the first specific number of pages.

3. The image forming apparatus according to claim 1, wherein:
the document determination unit predicts that the subsequent page is determined to be a monochrome document even when the area of the image data determined to be an electronic stamp is monochrome.

4. The image forming apparatus according to claim 1, wherein:
the document determination unit determines the page is a color document when the page of the document has a graph that is divided for each color and/or includes an image that is determined to be a national flag.

5. An image processing method executed by an image processing apparatus having a document reading unit that reads a document of a plurality of pages and outputs image data and is capable of determining whether the document is a color document or a monochrome document, comprising the steps of:
estimating that a subsequent page is also determined to be a monochrome document when monochrome pages of a first specific number of pages or more continue in the same job in the document read by the document reading unit;
executing monochrome image processing for a monochrome document to the image data immediately after reading the image data when the document is predicted to be a monochrome document;
storing a document estimation result and history of a page;

referring to the history; and estimating, when the format of the page is previously monochrome printed, the page as a monochrome document.

6. The image processing method according to claim 5, comprising:

estimating that the subsequent page is determined to be a monochrome document even when the pages including only the monochrome character string are continued for a second specific number of pages that is shorter than the first specific number of pages.

7. The image processing method according to claim 5, comprising:

estimating that the subsequent page is determined to be a monochrome document even when an area of the image data determined to be an electronic stamp is monochrome.

8. The image processing method according to claim 5, comprising:

determining, when a page of the document has a graph that is divided for each color and/or includes an image that is determined to be a national flag, that the page having a graph that is divided for each color and/or including an image that is determined to be a national flag is a color document.

9. The image processing method according to claim 5, wherein the image processing apparatus is an image forming apparatus.

10. The image processing method according to claim 9, comprising:

estimating that the subsequent page is determined to be a monochrome document even when the pages including only a monochrome character string are continued for a second specific number of pages that is shorter than the first specific number of pages.

11. The image processing method according to claim 9, comprising:

estimating that the subsequent page is determined to be a monochrome document even when an area of the image data determined to be an electronic stamp is monochrome.

12. The image processing method according to claim 9, comprising:

determining, when a page of the document has a graph that is divided for each color and/or includes an image that is determined to be a national flag, that the page having a graph that is divided for each color and/or including an image that is determined to be a national flag is a color document.

* * * * *